United States Patent
Hamburg et al.

(10) Patent No.: US 10,649,105 B1
(45) Date of Patent: May 12, 2020

(54) ACOUSTIC VECTOR SENSOR

(71) Applicant: Leidos, Inc., Reston, VA (US)

(72) Inventors: Brian Hamburg, Diamondhead, MS (US); Norman Gholson, Gulfport, MS (US)

(73) Assignee: Leidos, Inc., Reston, VA (US)

( * ) Notice: Subject to any disclaimer, the term of this patent is extended or adjusted under 35 U.S.C. 154(b) by 309 days.

(21) Appl. No.: 15/714,130

(22) Filed: Sep. 25, 2017

Related U.S. Application Data

(60) Provisional application No. 62/403,446, filed on Oct. 3, 2016.

(51) Int. Cl.
| | | |
|---|---|---|
| *G01V 1/18* | (2006.01) | |
| *G01V 1/00* | (2006.01) | |
| *G01V 1/38* | (2006.01) | |
| *G01H 3/12* | (2006.01) | |
| *G01P 5/02* | (2006.01) | |

(52) U.S. Cl.
CPC ............. *G01V 1/189* (2013.01); *G01H 3/125* (2013.01); *G01P 5/02* (2013.01); *G01V 1/001* (2013.01); *G01V 1/186* (2013.01); *G01V 1/38* (2013.01)

(58) Field of Classification Search
CPC .......... G01V 1/189; G01V 1/38; G01V 1/186; G01V 1/001; G01P 5/02; G01H 3/125
See application file for complete search history.

(56) References Cited

U.S. PATENT DOCUMENTS

| | | | | |
|---|---|---|---|---|
| 4,827,459 | A * | 5/1989 | Franklin | B06B 1/0655 |
| | | | | 310/337 |
| 6,697,302 | B1 * | 2/2004 | Cray | H04R 1/44 |
| | | | | 367/141 |
| 2012/0057430 | A1 * | 3/2012 | Rouquette | G01V 1/189 |
| | | | | 367/24 |
| 2017/0122975 | A1 * | 5/2017 | Keast | G01P 15/09 |

OTHER PUBLICATIONS

Geospace Technologies, "Geophones GS-11D" [online], Feb. 7, 2012 [retrieved on Sep. 19, 2017], 3 pp., Retrieved from the Internet: http://www.geospace.com/geophones-gs-11d/.
Meggitt, Meggitt Advanced Sensing Technologies, 4 pp.
Wilcoxon Sensing Technologies, "Low-Frequency Vector Sensor VS-301," 2 pp., Aug. 2017.
Wilcoxon Sensing Technologies, "Mid-Frequency Vector Sensor VS-209," 2 pp., Aug. 2017.
Wilcoxon Sensing Technologies, "Low-Frequency Vector Sensor VS-101," 2 pp., Aug. 2017.

* cited by examiner

*Primary Examiner* — Daniel Pihulic
(74) *Attorney, Agent, or Firm* — Dawn-Marie Bey; Bey & Cotropia PLLC

(57) ABSTRACT

An acoustic vector sensor ("AVS") includes one or more sensitive elements arranged in an orthogonal configuration to provide high-sensitivity directional performance. The one more sensitive elements may be seismometers arranged in a pendulum-type configuration. The AVS further includes a hydrophone.

18 Claims, 10 Drawing Sheets

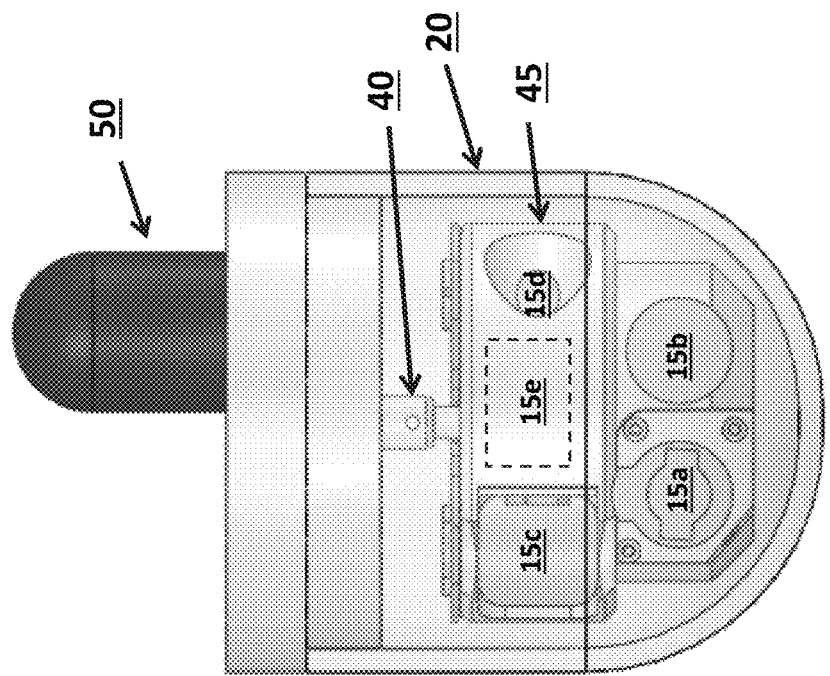
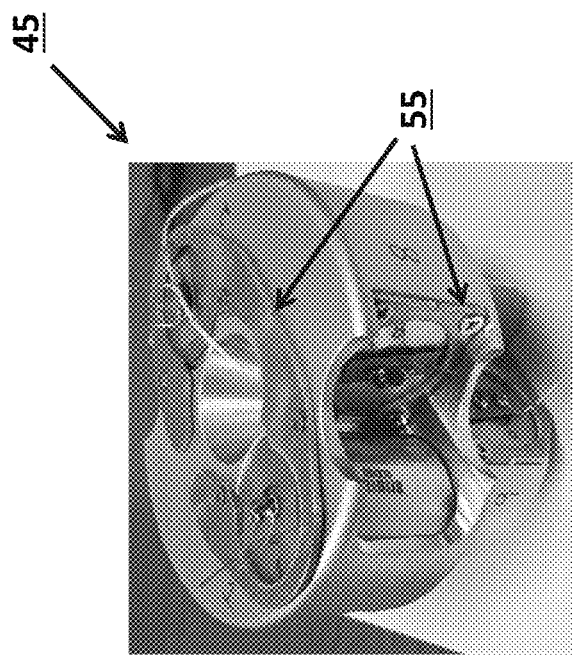
FIGURE 2b
FIGURE 2a

ACOUSTIC VECTOR SENSOR

CROSS-REFERENCE TO RELATED APPLICATIONS

The present application claims benefit of priority to U.S. Provisional Patent Application No. 62/403,446 directed to Acoustic Vector Sensor filed on Oct. 3, 2016, the entirety of which is incorporated herein by reference.

BACKGROUND

Field of the Embodiments

Generally, the field of the embodiments is acoustic vector sensors ("AVS").

Description of the Related Art

Acoustic vector sensors ("AVS") are gaining popularity in acoustic intelligence and surveillance applications. Sensitivity and directionality at lower frequencies make them ideally suited for many collection activities including anti-submarine warfare. One problem to date has been cost per unit which far exceeds cost for an array of omni-directional hydrophones which may be used for similar applications. A hydrophone array includes multiple hydrophone units to form a synchronized arrangement. These hydrophones may be placed in a variety of different array systems. The arrays may be placed in a number of configurations depending on use, including resting on the seafloor, moored in a vertical line array in the water column, or towed in a horizontal line array behind a boat or ship. Various sounds, e.g., from maritime vessels (ships, submarines), reach each individual hydrophone on the array at slightly different times depending on the direction from which the sound is coming. This time difference, i.e., time-of-arrival-difference, is used to determine direction. Directional hydrophones have a higher sensitivity to signals from a particular direction and may be used for locating and tracking objects.

The present embodiments seek to reduce cost for an AVS while retaining superior operational characteristics.

SUMMARY OF THE EMBODIMENTS

In a first exemplary embodiment, an acoustic vector sensor system includes a housing including therein one or more sensitive elements arranged in an orthogonal configuration and at least one omni-directional hydrophone.

In a second exemplary embodiment, an acoustic vector sensor system includes a waterproof housing containing therein a pendulum assembly, the pendulum assembly being attached to an interior portion of the waterproof housing via a pendulum mount and including therein an arrangement of seismometers; first and second flotation components, wherein the waterproof housing is secured between the first and second flotation components; and at least one omni-directional hydrophone.

In a third exemplary embodiment, an acoustic vector sensor system includes a cylindrical housing containing therein a pendulum assembly, the pendulum assembly being attached to an interior portion of the cylindrical housing via a pendulum mount and including therein an arrangement of at least three seismometers; and at least one omni-directional hydrophone.

BRIEF DESCRIPTION OF THE FIGURES

The following figures are intended to be considered in conjunction with the description below.

FIGS. 2a to 2c illustrate acoustic vector sensor ("AVS") using a pendulum assembly of in accordance with certain embodiments described herein;

DETAILED DESCRIPTION

Figure 1:
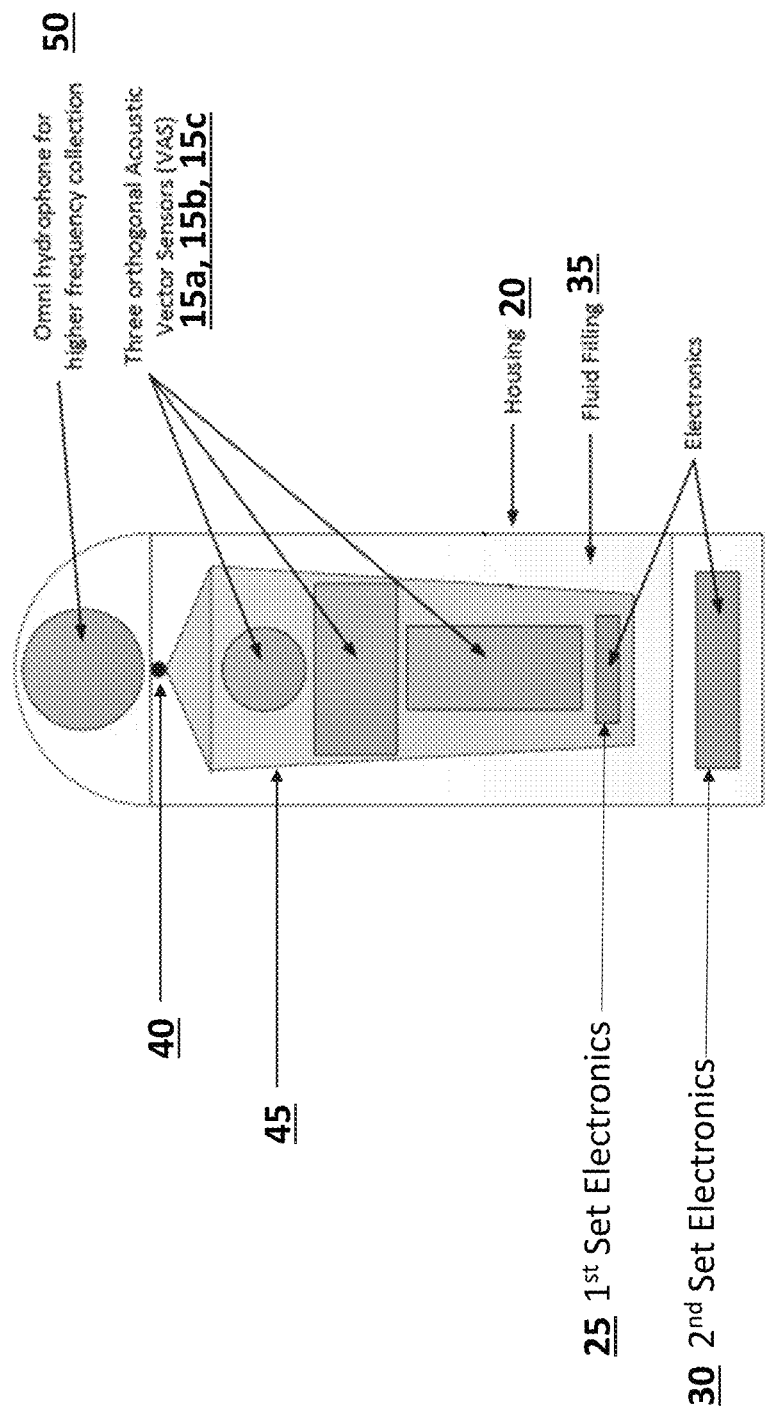
FIG. 1 is an exemplary acoustic vector sensor ("AVS") in accordance with an embodiment described herein.

Referring to FIG. 1, in a first particular exemplary embodiment, an acoustic vector sensor ("AVS") 10 includes three (3) seismometers or geophones (hereafter "sensors" or "seismometers" but not so limited) 15a, 15b, 15c, in an orthogonal, 3-axis configuration, to provide high-sensitivity directional performance. The embodiment of FIG. 1 is referred to as a pendulum-type and, as shown, is in a single sensor per axis configuration (1s Config). The second exemplary embodiment shown in FIGS. 2a and 2b is a dual sensor per axis, i.e., six (6) sensor 15a-15f (15f not shown, but opposite 15e), configuration (2s Config) pendulum-type. One skilled in the art will appreciate that the present embodiments may use fewer than three (3) seismometers.

As shown in the first and second exemplary embodiments, the seismometers are enclosed in a pendulum assembly 45 within a housing 20 and held in place by retainer plates 55 (see FIG. 2a), along with a first set of electronics 25 for pre-amplifying the analog signal from the seismometers. The first set of electronics 25 provides a low-noise preamplifier to preserve the inherent performance of the seismometers 15a-15f. The output of the preamplifier is typically routed to an A/D (Analog-to-Digital) converter.

The housing 20 may be filled with an appropriate fluid 35, such as a silicone-based fluid like Polydimethylsiloxane (PDMS) Silicone. In the configuration shown in FIGS. 1, 2a and 2b, the pendulum assembly 45 is attached to housing 20 via a pendulum mount 40.

The AVS is coupled with a hydrophone 50 and a second set of electronics 30 to form a complete AVS system that is far less expensive than existing commercial-off-the-shelf (COTS) designs and is competitive with prior art omni-directional hydrophones. The second of electronics 30, independent of the first set 25, digitizes the analog data and packetizes the data. The second set of electronics 30 also contains a 3-axis compass for heading and tilt. Although shown as separate sets of electronics, one skilled in the art recognizes that the components and functionality of the first and second electronics may be combined on a single board. Exemplary and non-limiting dimensional ranges for the AVS system include: 4" to 5" OD (outside diameter) and 7" to 17" length.

Figure 2C:
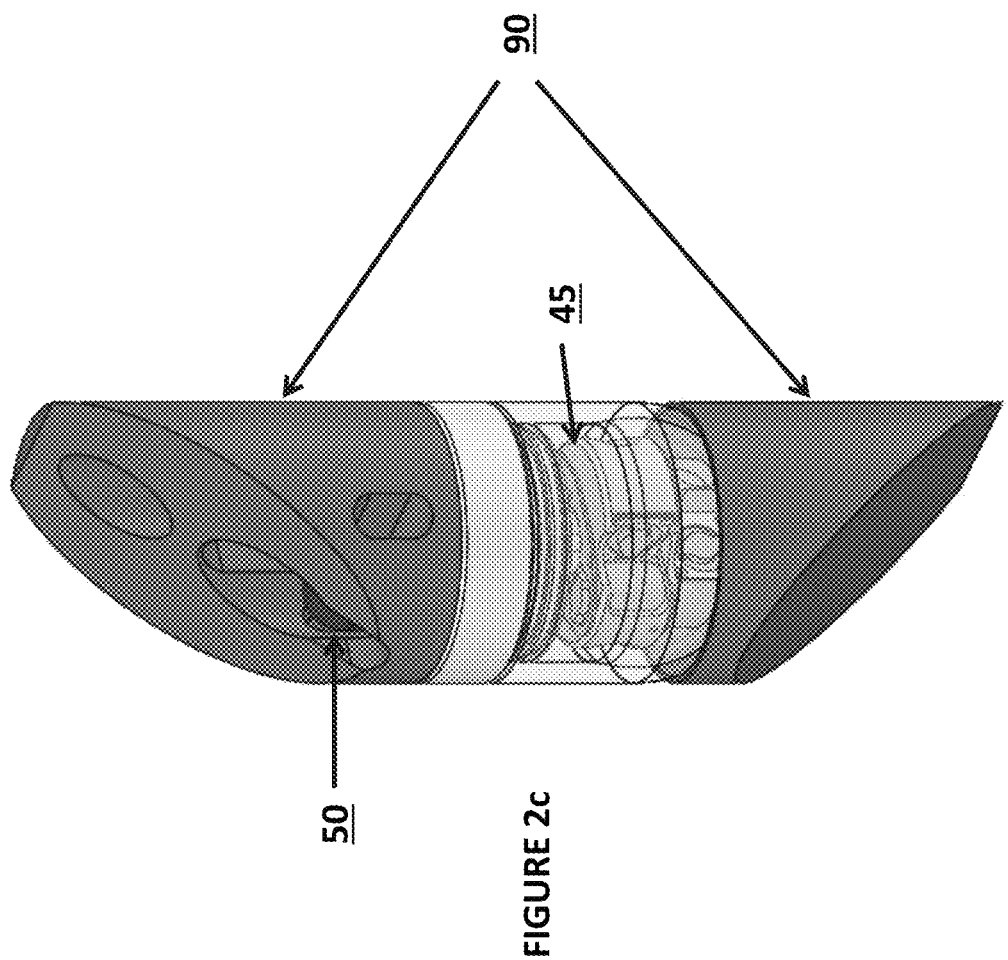

FIG. 2c illustrates the AVS fitted with a flotation mechanism 90. The flotation is needed to adjust the specific gravity of the sensor to reduce sensitivity loss due to the density mismatch to water.

The embodiments describe multiple embodiments of a precision, high-performance AVS using robust and inexpensive seismometers. These sensors are very rugged and suitable for deployment in the most demanding locations and using the most abusive deployment techniques.

Figure 3:
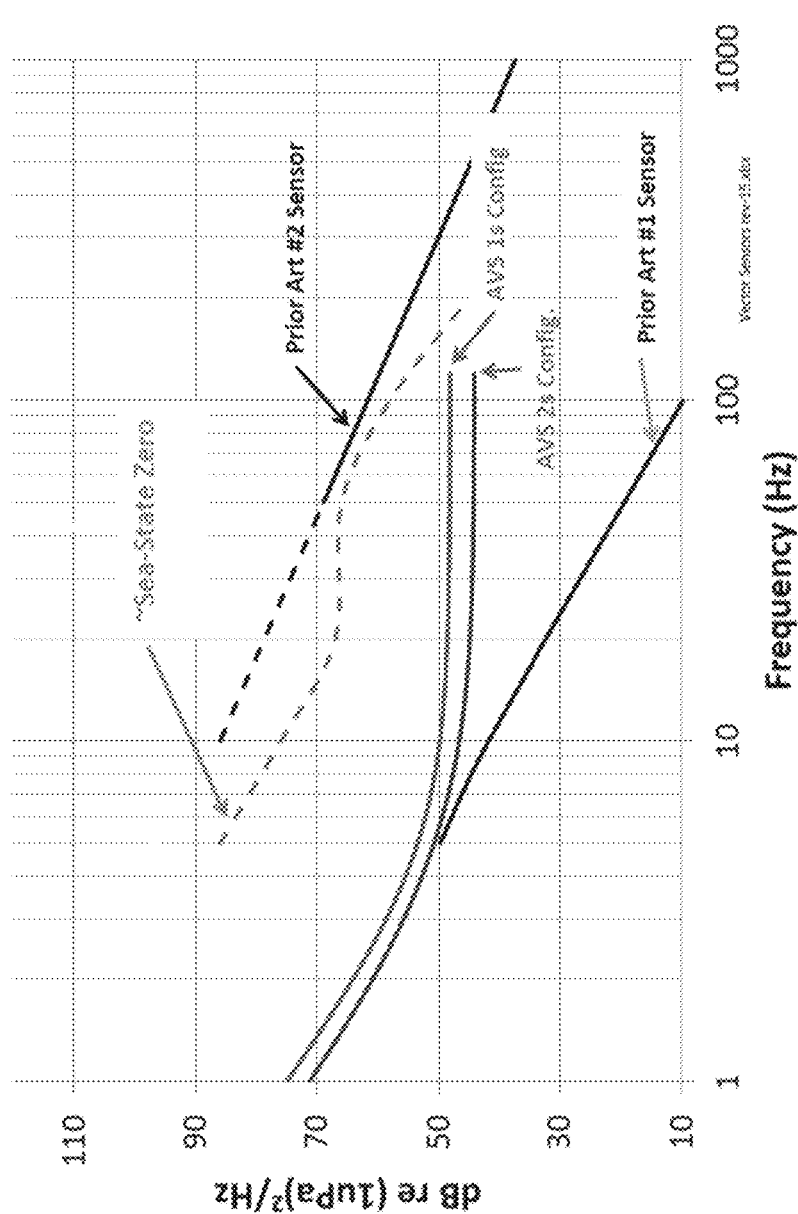
FIG. 3 is a vector sensor self-noise comparison of an ("AVS") in accordance with an embodiment described herein.

A key performance metric for a sensor of this type is self-noise. The graph at FIG. 3 shows self-noise in equivalent acoustic-pressure units. For perspective, self-noises of two prior-art sensors are plotted along with Sea-State-Zero ocean noise. While the self-noise of the prior-art #1 sensor is better than the present embodiment, the self-noise advantage is typically not useful since the Sea-State-Zero noise dominates. More importantly, the size and cost of prior-art #1 sensor are nearly an order of magnitude too high to accommodate the principle requirements being addressed. Self-noise of the prior-art #2 sensor is prohibitively high relative to Sea State Zero. The graph in FIG. 3 shows the AVS of the present embodiments ("Simple 1s Config") is quiet compared to Sea State zero, and thus sufficient to meet current needs. Additionally, a fairly simple modification, incorporating two sensitive elements per axis for a total of six (6) sensitive elements, improves the performance ("2s Config"). Increasing the number sensitive elements beyond two allows further improvements in self-noise. This property of the general embodiments presents the opportunity to create a family of vector sensors at different price points and self-noises.

The theory of operation of the pendulum-type AVS described herein is discussed below with reference to FIGS. 4-7. The AVS provides a unique suspension system that meets two fundamental requirements. The first is to autonomously and passively orient the sensitive elements to within an acceptable tolerance (±1 degree for example) of the optimum operating geometry. The second is to provide an acceptable motion transfer function (0 dB±0.5 dB from 0.1 Hz to 100 Hz for example) while maintaining fidelity of the signal (−30 dB harmonic distortion for example). In this case, the motion transfer-function is defined as the frequency-dependent relationship of the sensitive-element motion relative to the motion of the physical body housing the sensitive elements. These requirements are met by using a damped mechanical pendulum to support the sensitive elements. Gravity enables the suspension system to meet the geometric alignment requirement whereas viscous-fluid damping enables the suspension system to meet the motion transfer-function requirement.

The following sections present a simple physical model of the suspension system along with a mathematical analysis to quantify its performance. The analysis treats the X (east direction). Dynamics of the Y (north) direction is identical. The Z (up) direction is trivial since there is a rigid mechanical wire or rope (see FIG. 4) connecting the sensitive elements to the physical-body housing.

The math model assumes a general polynomial expression for the viscous coupling effect ($F_1$):

Note: m=1 meter of distance and s=1 second of time.

$$F_1 = K_d\left(a_1 \frac{\dot{R}}{q} + a_2\left(\frac{\dot{R}}{q}\right)^2 \text{sgn}(\dot{R})\right) \quad \text{eq (1)}$$

where $\dot{R} \triangleq \frac{d}{dt}[p(t) - x(t)]$ $q = 1$ m/s $\text{sgn}(\dot{R}) = +1$ for $\dot{R} \geq 0$ $\qquad = -1$ otherwise Wherein $a_1$, $a_2$, are dimensionless scaling constants and $K_d$ has units of force (Newtons). Sum forces in the x-direction:

$$F_x = MA_x = M\frac{d^2}{dt^2}x = M\ddot{x}$$

Where we include x-direction force due to the force of gravity on the sensitive-element represented by the lumped mass M:

$$M\ddot{x} = F_1 - Mg\tan(\Phi) \text{ where } g \triangleq \text{gravity constant} = 9.8\frac{m}{s^2}$$

And substituting the expression for $F_1$ results in the second-order non-linear differential equation (1) below:

$$M\ddot{x} = K_d\left(a_1 \frac{\dot{R}}{q} + a_2\left(\frac{\dot{R}}{q}\right)^2 \text{sgn}(\dot{R})\right) - Mg\tan(\Phi) \quad \text{eq (2)}$$

The trig expression $\tan(\Phi)$ can be eliminated by recognizing (from FIG. 4) that $$\tan(\Phi) = \frac{x-p}{h} \text{ and } h = \sqrt{L^2 - (x-p)^2}.$$

So, equation (2) can be rewritten as:

$$M\ddot{x} = K_d\left(a_1 \frac{\dot{R}}{q} + a_2\left(\frac{\dot{R}}{q}\right)^2 \text{sgn}(\dot{R})\right) - Mg\frac{x-p}{\sqrt{L^2 - (x-p)^2}}$$

The analysis that follows linearizes the math model and develops closed-form solutions for the motion transfer function and homogeneous transient response.

Equation (2) can be simplified by recognizing $$\tan(\Phi) = \frac{x-p}{h}$$

and h≈L for all cases of interest. Therefore $\tan(\Phi)$ of equation (2) can be replaced by $$\frac{x-p}{L}$$

to provide:

$$M\ddot{x} = K_d\left(a_1 \frac{\dot{R}}{q} + a_2\left(\frac{\dot{R}}{q}\right)^2 \text{sgn}(\dot{R})\right) - Mg\frac{x-p}{L} \quad \text{eq(2')}$$

And, the equation can be further simplified by recognizing that $a_2$ is virtually zero for cases of interest. This simplification results in the linear $2^{nd}$ order equation:

$$M\ddot{x} = K_d\left(a_1\frac{\dot{R}}{q}\right) - Mg\frac{x-p}{L} \qquad eq(2'')$$

where q is simply a units-normalizing factor, $$q = 1\frac{m}{s}.$$

In this simpler form, the shorthand parameter R can easily be replaced by its definition:

$$\dot{R} = \frac{d}{dt}[p(t) - x(t)] = \frac{d}{dt}p(t) - \frac{d}{dt}x(t)$$

where (see FIG. 4)
p(t)=x—direction motion of the outside physical housing relative to the inertial coordinate system, and
x(t)=x—direction motion of the sensitive element relative to the inertial coordinate system. Substituting into eq(2'') and replacing the "dot" notation with the more explicit derivative notation results in:

$$M\frac{d^2}{dt^2}x(t) = K_d\frac{a_1}{q}\frac{d}{dt}p(t) - K_d\frac{a_1}{q}\frac{d}{dt}x(t) - Mg\frac{x(t)-p(t)}{L}$$

dividing through by the M and rearranging terms:

$$\frac{d^2}{dt^2}x(t) + \frac{K_d}{M}\frac{a_1}{q}\frac{d}{dt}x(t) + \frac{g}{L}[x(t) - p(t)] = \frac{K_d}{M}\frac{a_1}{q}\frac{d}{dt}p(t) \qquad eq(3)$$

At this point, it is convenient to solve for the steady-state response to a sinusoidal input p(t) by taking the Laplace transform of equation (3). In doing so the derivative operators $$\frac{d}{dt}$$

are replaced by the Laplace parameter "s" and x(t) and p(t) are replaced by X(s) and P(s) resulting in the algebraic form of the differential equation:

$$s^2 X(s) + s\frac{K_d}{M}\frac{a_1}{q}X(s) + \frac{g}{L}[X(s) - P(s)] = \frac{K_d}{M}\frac{a_1}{q}sP(s)$$

From here, we can solve the transfer function H(s):

$$H(s) \triangleq \frac{X(s)}{P(s)} = \frac{\frac{K_d}{M}\frac{a_1}{q}s + \frac{g}{L}}{s^2 + \frac{K_d}{M}\frac{a_1}{q}s + \frac{g}{L}} \qquad eq(4)$$

By substituting $s=j\omega$ (where $j=\sqrt{-1}$ and $\omega=2\pi f$ and f=frequency (Hz)) we obtain the motion transfer function for a steady-state sinusoidal excitation p(t).

Figure 5:
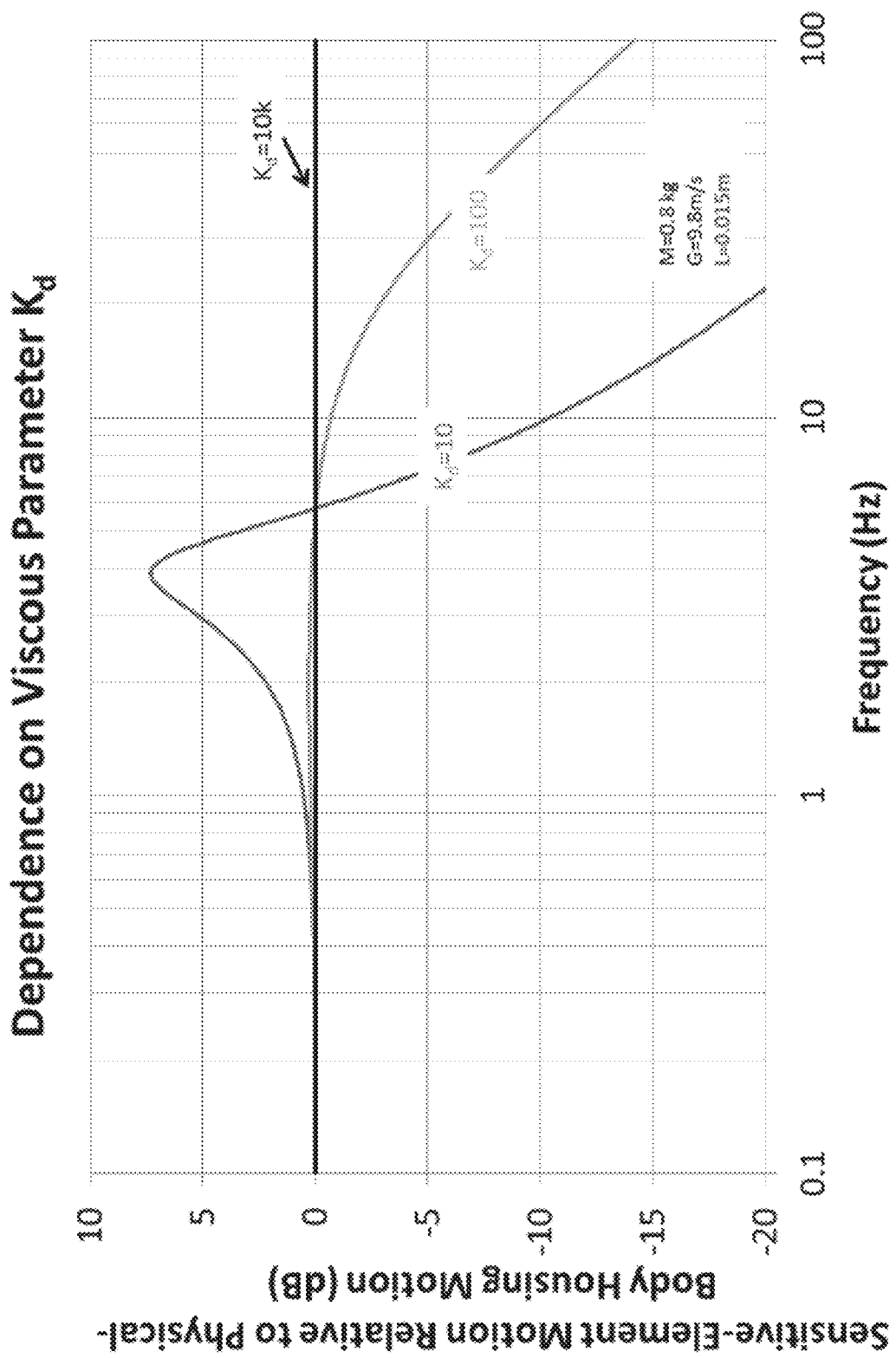
FIG. 5 graphs dependence of seismometer-element motion relative to housing on viscosity of fluid in housing in accordance with an embodiment described herein.

The magnitude-part of eq(4) is graphically illustrated in FIG. 5. For small values of Kd (<100), the motion transfer function is unfavorable with respect to typical requirements (0 dB±0.5 dB). For larger values (Kd>10,000 for example), the motion transfer function is much better than typical requirements.

Figure 4:
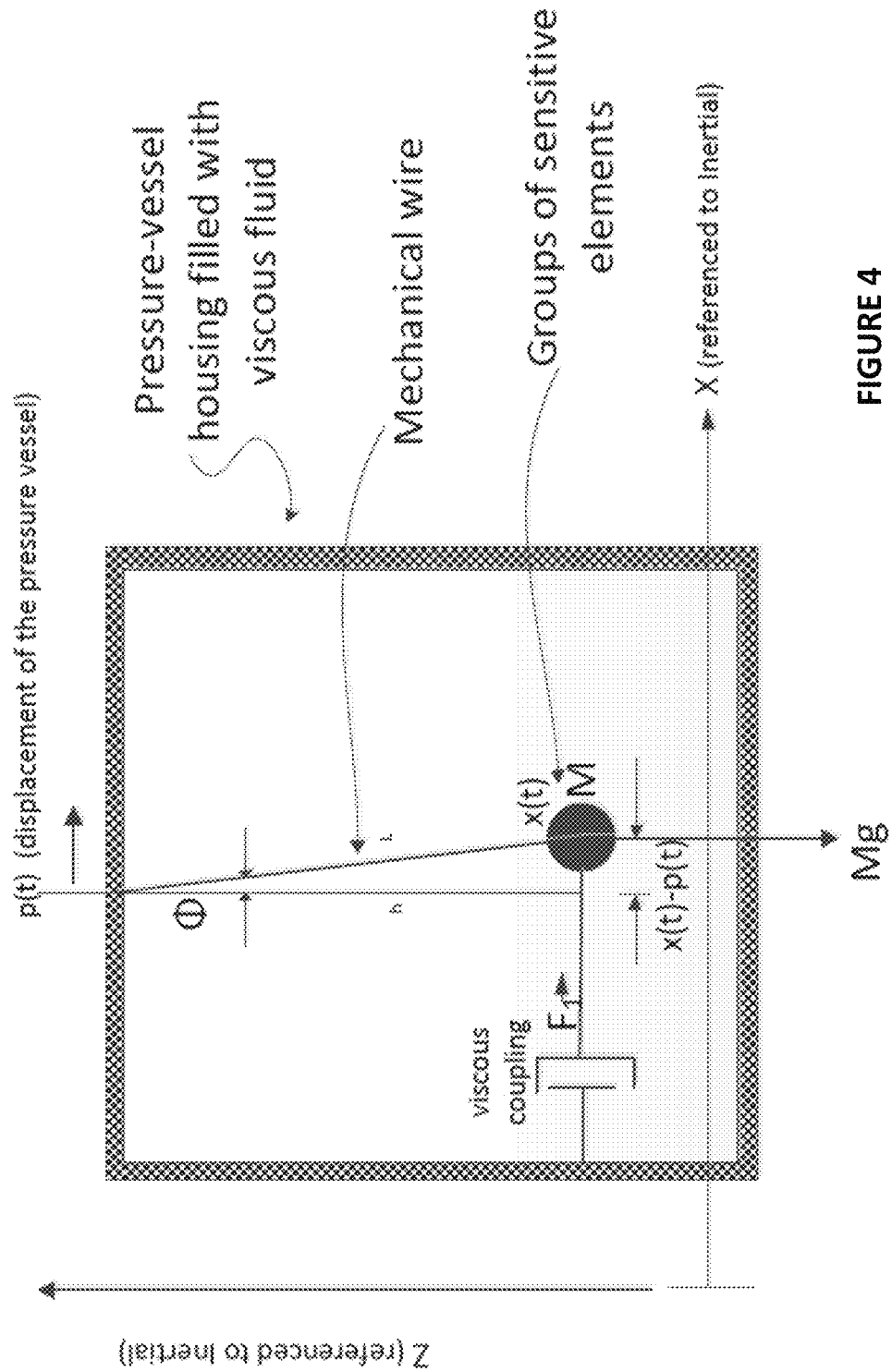
FIG. 4 illustrates a simple physical model of a suspension system in accordance with an embodiment described herein.
Figure 7:
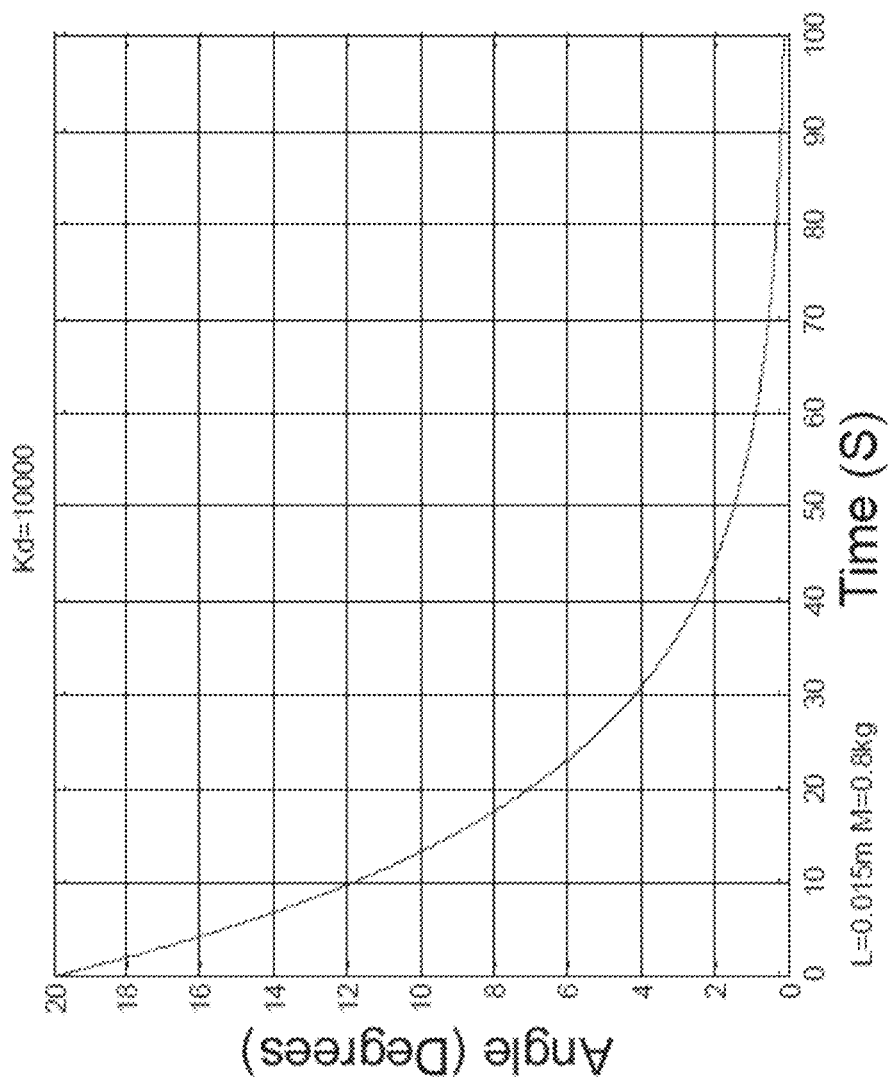
FIG. 7 plots orientation of the sensitive elements as a function of time where the initial orientation is 20 degrees relative to the required orientation.

The parameter Kd is related to viscosity of the fluid filling the housing of FIG. 4. From FIG. 5, it is clear that a value of Kd=10,000 or greater is satisfactory to achieve the desired motion transfer function. It is important to relate this parameter to mechanical considerations such as time required for the suspension system to orient the sensitive elements to the required geometry. The following analysis provides this relationship by computing the homogeneous transient response of the suspension system for the case where $a_2=0$ in eq(1) (same as for the motion-transfer-function analysis). FIG. 7 provides a practical example by plotting orientation of the sensitive elements as a function of time where the initial orientation is 20 degrees relative to the required orientation. FIG. 7 shows that the suspension system requires about 55 seconds to achieve the typically-required 1-degree alignment for the case where Kd=10,000. This amount of time is quite acceptable for the intended operation of the device. The next section derives an expression for the homogeneous response with arbitrary initial conditions. This is the expression used to compute the graph of FIG. 7.

For the homogeneous case, we set the forcing function, p(t), in equation (3) to zero, resulting in:

$$\frac{d^2}{dt^2}x(t) + \frac{K_d}{M}\frac{a_1}{q}\frac{d}{dt}x(t) + \frac{g}{L}x(t) = 0 \qquad eq(3H)$$

It is now convenient to express the $$\frac{d^2}{dt^2}x(t)$$

in terms of $$\frac{d}{dt}x(t) \text{ and } x(t)$$

$$\frac{d^2}{dt^2}x(t) = \frac{-K_d}{M}\frac{a_1}{q}\frac{d}{dt}x(t) - \frac{g}{L}x(t) \qquad eq(5)$$

Figure 6:
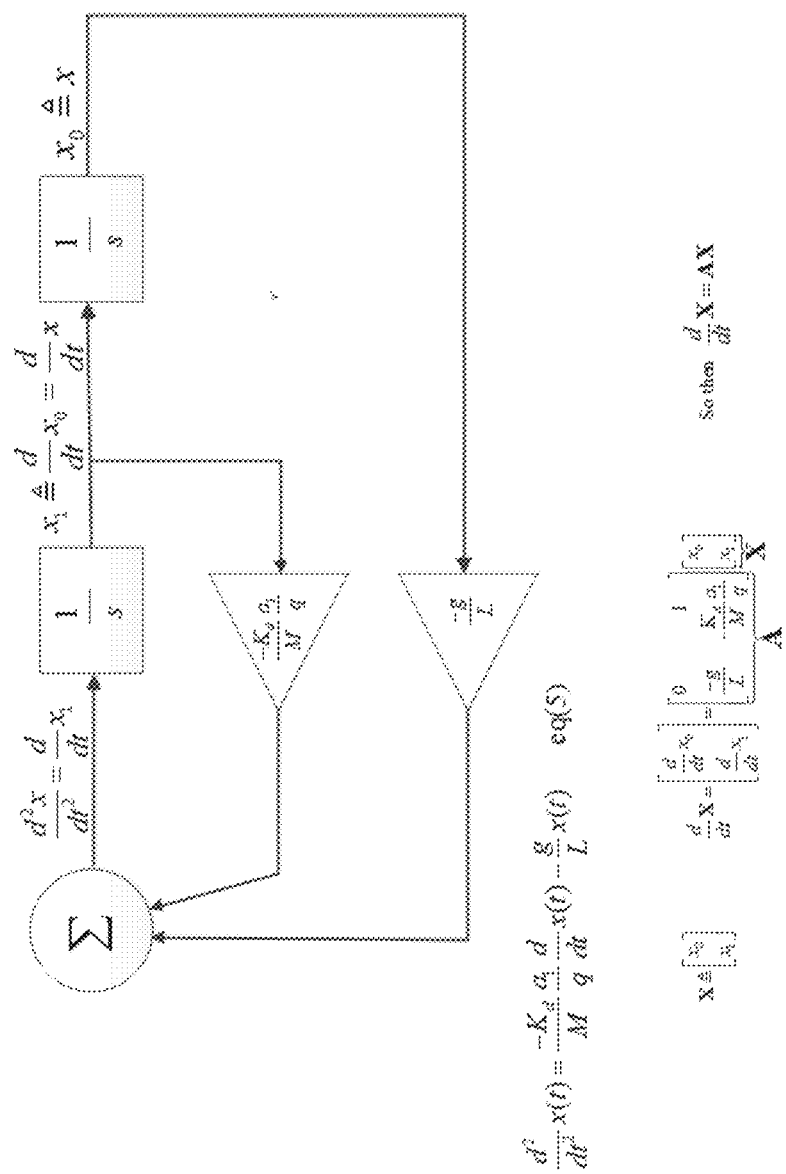
FIG. 6 provides a graphical representation of equation (5)

We can now use equation(5) to draw a signal-flow graph and define a state-variable vector X. FIG. 6 provides a graphical representation of eq(5). The state-variable vector defines the "state" of the second-order system. One element ($x_0$) accounts for the displacement (x) of the mass M. The other element, ($x_1$) accounts for the velocity $$\frac{dx}{dt}$$

So, the state vector is defined by:

$$\frac{d}{dt}X = \begin{bmatrix}\frac{d}{dt}x_0 \\ \frac{d}{dt}x_1\end{bmatrix} = \underbrace{\begin{bmatrix}0 & 1 \\ \frac{-g}{L} & -\frac{K_d}{M}\frac{a_1}{q}\end{bmatrix}}_{A}\underbrace{\begin{bmatrix}x_0 \\ x_1\end{bmatrix}}_{X}$$

Where the derivation of matrix A is more-clearly presented in FIG. 6. So then $$\frac{dx}{dt}X = AX$$

represents a matrix-version of eq(5), which has the solution:

$$x(t)=e^{At}X(t=0) \qquad \text{eq(6)}$$

Where the two elements of X(t) represent the displacement and velocity of the mass M (representing the sensitive element). And, X(t=0) is simply the displacement and velocity of the mass M at time=0. Computing the 2×2 matrix $e^{At}$ is easily accomplished with a computer implementing the numerical series expansion:

$$e^{At} = ID + At + \frac{1}{2}(At)^2 + \frac{1}{6}(At)^3 + .$$

FIG. 7 shows an example transient response computed from eq(6). FIG. 7 shows that the suspension system requires about 55 seconds to achieve the typically-required 1 degree alignment for the case where Kd=10,000. This amount of time is quite acceptable for the intended operation of the device.

Figure 8:
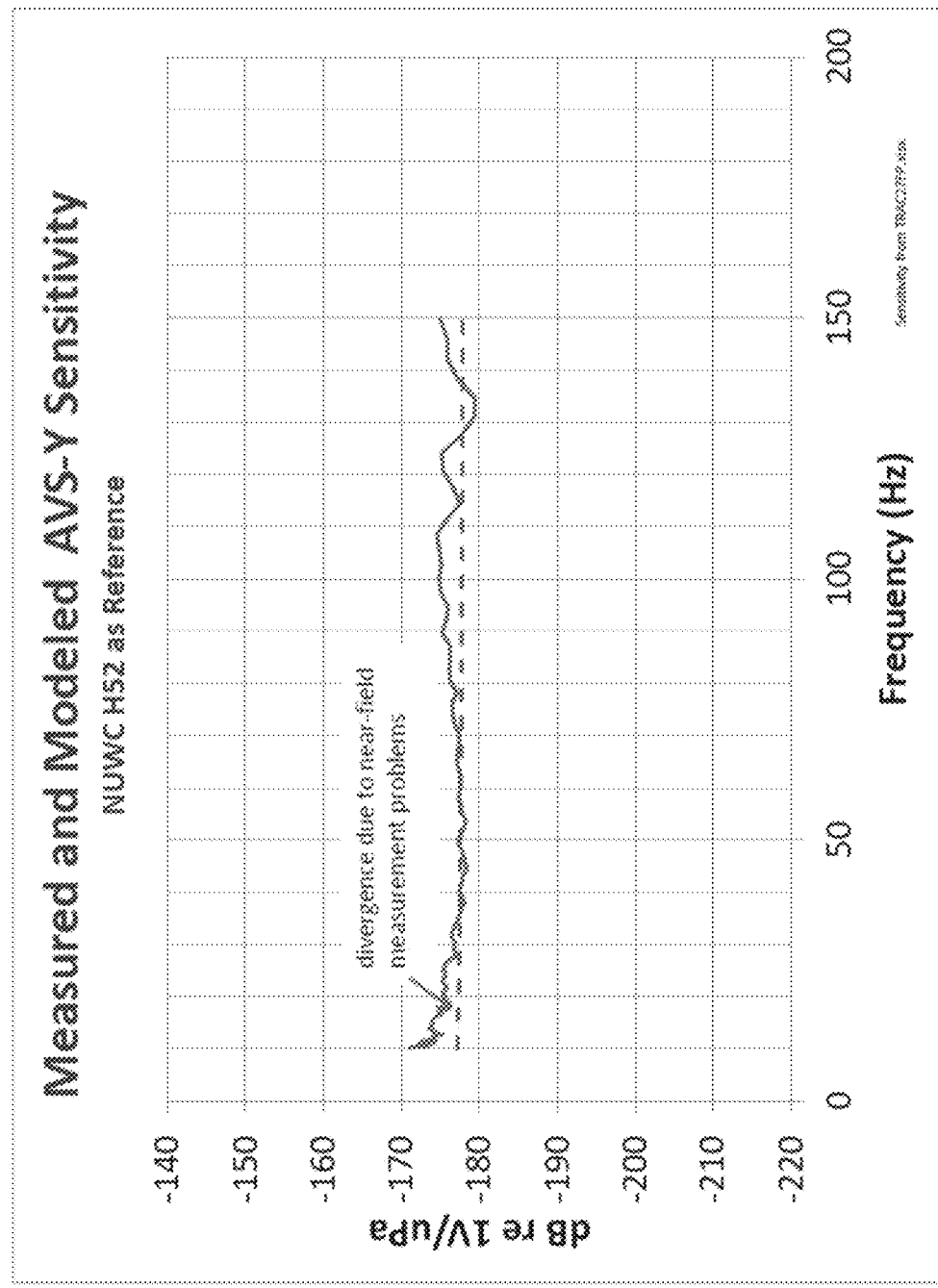
FIG. 8 plots measured and expected data for sensitivity of an AVS as a function of frequency.

Underwater tests were performed at a US Government facility located on Seneca Lake, N.Y. The tests served to verify operation of the AVS and validate the math model described above. The validation was done by comparing the AVS response to that of a calibrated reference hydrophone. FIG. 8 provides a sample of the results. The solid curve represents measured sensitivity of the AVS as a function of frequency. The dashed curve represents the sensitivity predicted from the above-presented suspension-system model in conjunction with a math model of the internal sensitive elements. The agreement between the measured data and the math model from 30 Hz to 150 Hz indicate the math model is accurately accounting for the physical processes. The systematic-like divergence between the two curves from 30 Hz to 10 Hz is caused by near-field effects of the measurement setup. The near-field-effects change the relationship between acoustic pressure and particle velocity. In doing so, it alters the comparison between the pressure-sensitive calibrated reference hydrophone and particle-velocity-sensitive AVS. In summary, the measured data indicate that the math models accurately account for the physical processes and that the AVS performs as designed.

Figure 9:
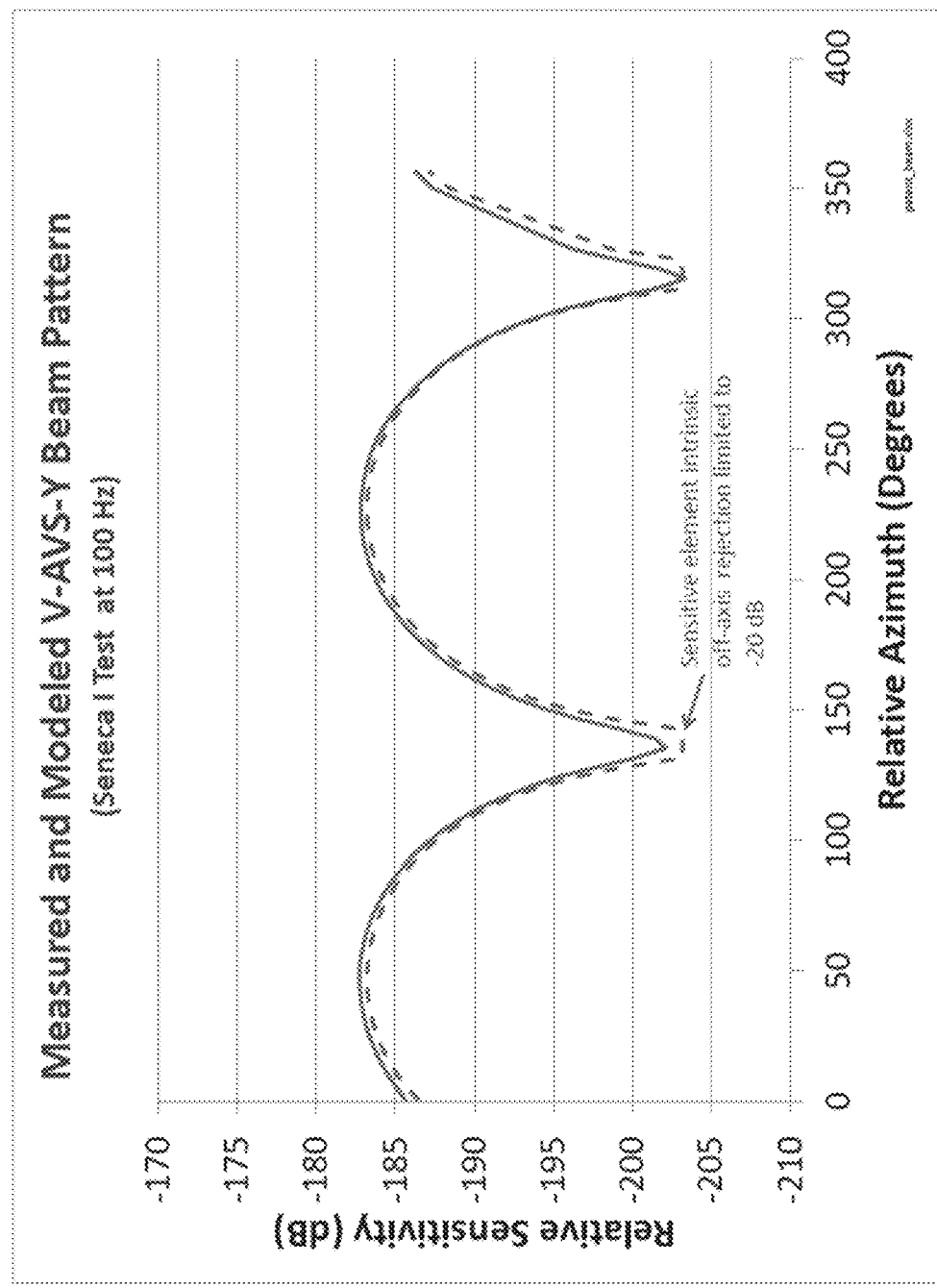
FIG. 9 plots measured and expected data for AVS beam-pattern defined as the response of the AVS as a function of azimuth.

The AVS beam-pattern was also measured at the US Government facility located on Seneca Lake. In this case, beam-pattern is defined as the response of the AVS as a function of azimuth. A sample of these data is shown in FIG. 9. The solid curve represents the measured data whereas the dashed curve represents a standard cosine math model. These data are further evidence that the math models accurately account for the physical processes and that the AVS performs as designed.

As discussed above, AVS systems provide more sensor degrees of freedom than conventional omni-based systems and result in the ability to provide bearing ambiguity elimination, effective background noise isolation or shading, and steering of beams to place nulls where desired. To date, the cost of prior art systems, i.e., the typically-used force-feedback implementation, has been a large deterrent to larger scale use. The technology described herein significantly reduces cost and makes it feasible to produce AVS for use in single-point, array, and networked array systems.

One skilled in the art recognizes that the AVS embodiments described herein may be used in numerous applications including, but not limited to: Anti-Submarine Warfare; Ocean Noise Measurement; Marine Mammal Monitoring; Ocean Observation; Environmental Monitoring; Offshore Energy Operations; Marine Renewable Energy; Tidal Energy; Wave Energy; Offshore; Wind Farms; Ocean Observatories; Earthquake & Tsunami Monitoring; Subsea Volcano Detection; ROV's & AUV's; Harbor Security; Pipeline Leak Detection; Fisheries Research; and Arctic Ice Monitoring.

The exemplary embodiments described herein are not intended to be limiting. Certain variations to one or more aspects will be readily recognized by those skilled in the art and are intended to be considered as being within the scope of the embodiments.

The invention claimed is:

1. An acoustic vector sensor system comprising:
   a housing including therein one or more sensitive elements arranged in an orthogonal configuration;
   at least one omni-directional hydrophone; and
   a pendulum assembly including the one or more sensitive elements connected to an interior portion of the housing via a pendulum mount.

2. The acoustic vector sensor system of claim 1, further comprising:
   a set of electronics for receiving analog signals from the one or more sensitive elements and for pre-amplifying the analog signals therefrom.

3. The acoustic vector sensor system of claim 1, wherein the housing is filled with a fluid.

4. The acoustic vector sensor system of claim 1, wherein the one or more sensitive elements are seismometers.

5. The acoustic vector sensor system of claim 1, wherein the one or more sensors include six seismometers, wherein two of the six seismometers are arranged in a direction of each of three orthogonal axes.

6. The acoustic vector sensor system of claim 1, wherein the system has an outside diameter in the range of approximately 4 to 5 inches and a length in the range of approximately 7 to 17 inches.

7. An acoustic vector sensor system comprising:
   a waterproof housing containing therein a pendulum assembly, the pendulum assembly being attached to an interior portion of the waterproof housing via a pendulum mount and including therein an arrangement of seismometers;
   first and second flotation components, wherein the waterproof housing is secured between the first and second flotation components; and
   at least one omni-directional hydrophone.

8. The acoustic vector sensor system of claim 7, wherein the arrangement of seismometers includes multiple seismometers, wherein at least one of the multiple seismometers is arranged in each of three orthogonal axis configurations.

9. The acoustic vector sensor system of claim 7, further comprising:
   a set of electronics for receiving analog signals from each of the seismometers and for pre-amplifying the analog signals from the seismometers.

10. The acoustic vector sensor system of claim 7, wherein the waterproof housing is filled with a fluid.

11. The acoustic vector sensor system of claim 8, wherein the multiple seismometers include three seismometers.

12. The acoustic vector sensor system of claim 8, wherein the multiple seismometers include six seismometers, where two of the six seismometers are arranged in each of the three orthogonal axes.

13. An acoustic vector sensor system comprising:
   a cylindrical housing containing therein a pendulum assembly, the pendulum assembly being attached to an interior portion of the cylindrical housing via a pendulum mount and including therein an arrangement of at least three seismometers; and
   at least one omni-directional hydrophone.

14. The acoustic vector sensor system of claim 13, further comprising:
   a set of electronics for receiving analog signals from each of the at least three seismometers and for pre-amplifying the analog signals from each of the at least three seismometers.

15. The acoustic vector sensor system of claim 13, wherein each of the three seismometers are arranged in each of three orthogonal axes.

16. The acoustic vector sensor system of claim 13, wherein each of the acoustic vector sensor system includes six seismometers arranged in two in each of three orthogonal axes.

17. The acoustic vector sensor system of claim 13, further comprising first and second flotation components, wherein the cylindrical housing is secured between the first and second flotation components.

18. The acoustic vector sensor system of claim 13, wherein the system has an outside diameter in the range of approximately 4 to 5 inches and a length in the range of approximately and 7 to 17 inches.

* * * * *